United States Patent
Bondi et al.

[19]

[11] Patent Number: 5,881,277

[45] Date of Patent: Mar. 9, 1999

[54] PIPELINED MICROPROCESSOR WITH BRANCH MISPREDICTION CACHE CIRCUITS, SYSTEMS AND METHODS

[75] Inventors: James O. Bondi, Plano; Simonjit Dutta, Dallas, both of Tex.; Ashwini K. Nanda, New York, N.Y.

[73] Assignee: Texas Instruments Incorporated, Dallas, Tex.

[21] Appl. No.: 874,786

[22] Filed: Jun. 13, 1997

Related U.S. Application Data

[60] Provisional application No. 60/020,081 Jun. 13, 1996.
[51] Int. Cl.[6] .................................................. G06F 9/38
[52] U.S. Cl. ........................................ 395/586; 395/395
[58] Field of Search ................................. 395/384, 389, 395/390, 391, 393, 394, 395, 568, 580, 581, 584, 586, 588; 711/118, 123, 125, 137, 138

[56] References Cited

U.S. PATENT DOCUMENTS

| | | | |
|---|---|---|---|
| 4,638,423 | 1/1987 | Ballard | 395/500 |
| 4,851,993 | 7/1989 | Chen et al. | 711/138 |
| 5,193,157 | 3/1993 | Barbour et al. | 395/581 |
| 5,442,760 | 8/1995 | Rastad et al. | 395/391 |
| 5,642,493 | 6/1997 | Burgess | 711/116 |
| 5,687,338 | 11/1997 | Boggs et al. | 395/381 |

*Primary Examiner*—Parshotam S. Lall
*Assistant Examiner*—Viet Vu
*Attorney, Agent, or Firm*—Robert D. Marshall, Jr.; Gerald E. Laws; Richard L. Donaldson

[57] ABSTRACT

A microprocessor comprising an instruction pipeline (36) comprising a plurality of successive instruction stages. An instruction passes from a beginning stage (38), through a plurality of intermediary stages (40 through 52), and to an ending stage (54) of the plurality of successive instruction stages. The microprocessor also comprises a storage circuit (58) coupled to receive program thread information output from a first stage (48) of the intermediary stages. Still further, the microprocessor comprises selection circuitry (56) comprising a first input, a second input, and an output for outputting output information from its first and second inputs. The first input of the selection circuitry is coupled to receive output information output from the first stage. The second input of the selection circuitry is coupled to receive program thread information output from the storage circuit. The output of the multiplexer is coupled to an input of a second stage (50) of the intermediary stages, wherein the second stage follows the first stage. Other circuits, systems, and methods are also disclosed and claimed.

16 Claims, 3 Drawing Sheets

```
outer_loop: for(K=1;K<=100;K++)
    }/* begin outer loop body */
           ⋮
    inner_loop: for (J=1;J<=100;J++)
        }/* begin inner loop body */
               ⋮
        }/* end inner loop body */
           ⋮
    }/* end outer loop body */
```

PIPELINED MICROPROCESSOR WITH BRANCH MISPREDICTION CACHE CIRCUITS, SYSTEMS AND METHODS

This application claims priority under 35 USC 119(e)(1) of the provisional application number 60/020,081, filed Jun. 13, 1996.

TECHNICAL FIELD OF THE INVENTION

The present embodiments relate to microprocessors, and are more particularly directed to a pipelined microprocessor with branch misprediction circuits, systems, and methods.

BACKGROUND OF THE INVENTION

The embodiments described below involve the developing and ever-expanding field of computer systems and microprocessors. Modern microprocessors now include one or more pipelines with numerous stages so that different instructions may be at different stages at the same time of operation. Moreover, some microprocessors include more than one pipeline in this manner and, therefore, can perform more than one instruction execution at a time. Naturally, the ability to execute more than one instruction at a time provides vast increases in processor speed and, therefore, is highly desirable. Nevertheless, these advanced techniques give rise to countless design complexities.

Certain design complexities arise from considerations of branch instructions, that is, those instructions which direct program control away from the otherwise sequential operation established by sequentially oriented software. Various techniques are now in the art to handle certain branch complexities, such as those which predict the likelihood that the condition of a branch will or will not be satisfied (sometimes referred to as "taken" or "not taken", respectively). These processes are particularly useful in a superscalar microprocessor. For example, consider the instance where a branch instruction arranged first in a sequence is followed at some point thereafter by some later-occurring instruction which, if executed, would cause some result. If a prediction technique accurately states that the branch will be satisfied (i.e., branch taken), then it may well be worthwhile not to concurrently execute the later-occurring instruction. On the other hand, if the prediction technique accurately states that the branch condition will not be satisfied (i.e., branch not taken), then it may well be appropriate and advantageous to concurrently execute the later-occurring instruction.

While branch prediction techniques are, in general, beneficial in certain instances, mis-predictions of branch execution can be very costly in terms of microprocessor efficiency. For example, as the pipelines of modern superscalar machines get deeper (i.e., hold more instructions at varying stages at once), and as such machines also become super-pipelined (i.e., capable of more concurrent executions), a mispredicted branch may heavily penalize performance by requiring a pipeline or pipelines to be emptied and subsequently re-filled with instructions from the correct target address. In this instance, numerous cycles are required to reset the pipeline(s) to an operational state and, thus, valuable processor cycle time is lost. While modern branch target buffer technology reduces the flush/refill penalty rate by often correctly predicting program flow past branches, the branch misprediction penalty that remains is one of the more serious impediments to realizing even higher processor performance.

In view of the above, there arises a need to address the drawbacks of the effects of mispredicted branches in a pipelined microprocessor.

SUMMARY OF THE INVENTION

In the preferred embodiment, there is a microprocessor comprising an instruction pipeline. The instruction pipeline comprises a plurality of successive instruction stages. An instruction passes from a beginning stage, through a plurality of intermediary stages, and to an ending stage of the plurality of successive instruction stages. The microprocessor also comprises a storage circuit coupled to receive program thread information output from a first stage of the intermediary stages. Still further, the microprocessor comprises selection circuitry comprising a first input, a second input, and an output for outputting output information from its first and second inputs. The first input of the selection circuitry is coupled to receive output information output from the first stage. The second input of the selection circuitry is coupled to receive program thread information output from the storage circuit. The output of the multiplexer is coupled to an input of a second stage of the intermediary stages, wherein the second stage follows the first stage. Other circuits, systems, and methods are also disclosed and claimed.

BRIEF DESCRIPTION OF THE DRAWINGS

FIG. 2 illustrates a microprocessor pipeline system having a machine word cache which may selectively provide machine word threads to an intermediary stage in the microprocessor pipeline;

DETAILED DESCRIPTION OF THE PREFERRED EMBODIMENTS

Given the considerations set forth in the above Background, the inventors of the present embodiments have recognized that advanced mechanisms can be used, either alone or in conjunction with a branch target buffer ("BTB"), to even further reduce misprediction penalty. Therefore, the present embodiments may be of enormous value in future microprocessor design. To demonstrate the preferred embodiments, FIG. 1a first introduces the concept of a microprocessor pipeline, with it understood that a pipeline by itself is known in the art. However, as demonstrated below, the present inventors now focus on a division of the stages of the pipeline which facilitates an understanding of a novel architecture for reducing misprediction penalty as appreciated from the following.

Figure 1A:
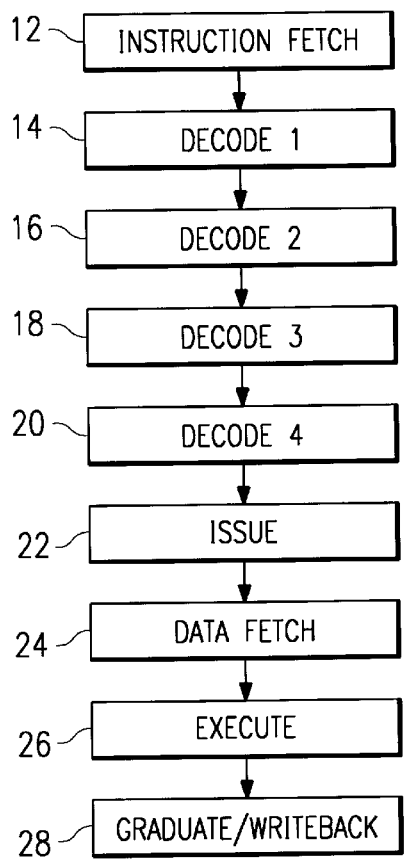
FIG. 1a illustrates a diagram of a prior art microprocessor pipeline.

FIG. 1a illustrates a prior art microprocessor pipeline designated generally at 10 and of the type commonly existing in the current art to receive and process instructions in a complex instruction set computer ("CISC"). Pipeline 10 is shown by way of example as having nine stages evenly numbered 12 through 28. Each of stages 12 through 28 is representative of a stage or stages known in the art, and may differ in name and/or function in different architectures. Thus, the following discussion is by way of example and without limitation to the inventive embodiments discussed later. Turning to pipeline 10, note generally that an instruction is retrieved at a beginning stage which in the present example is an instruction fetch stage 12. Instruction fetching by stage 12 may occur from various resources such as caches and various levels of memory. Note also that some instruction fetches may stall the pipeline more than one clock cycle, particularly to access slower components of the memory hierarchy system. Typically, the received instruction is thereafter decoded in one or more decoding stages. While a pipeline may therefore include an integer number of decode stages, pipeline 10 includes four such stages by way of example. The multi-stage decode process decompresses the more complicated instruction into one or more simple operations referred to in this document as micro-operation codes. These micro-operation codes typically may be executed in a single execution clock. Note also that micro-operation codes have different names depending on the architecture and/or manufacturer. For example, in the Texas Instruments' standard, micro-operation codes are referred to as atomic operations ("AOps"). These AOps, if completed in their entirety, represent completion and graduation of the instruction set instruction, including its opcode and operands if applicable. Note that AOps are approximately comparable to some RISC instructions and, thus, are the codes which are connected to various portions of the microprocessor to subsequently initiate execution of the decoded instruction. Thus, AOps are comparable to what is referred to in other architectures as ROps, $\mu$Ops, or RISC86 instructions.

After the micro-operation codes are generated from decode stages 14 through 20, stage 22 issues those codes to the corresponding appropriate execution units of the microprocessor. In some conventions, the issue stage is referred to as the scheduling of each micro-operation code to its execution unit. For example, if a microprocessor includes three execution units (e.g., an arithmetic unit, a load/store unit, and a floating point unit), then a group of up to three micro-operation codes may be formed and assigned for execution in a single clock cycle by each corresponding execution unit. Indeed, a microprocessor may include more than three execution units, such as by having more than one arithmetic unit and more than one load/store unit. In such an event, the number of micro-operation codes to be executed in a single clock cycle may be increased accordingly. For purposes of a referring term to use in this document, the group of micro-operation codes, regardless of its size, is referred to as a "machine word." It is not uncommon for such a machine word to require 50 or more bits per execution resource and, therefore, a microprocessor with three execution units may operate in response to a machine word on the order of 150 bits in width.

After the machine word is issued, stage 24 fetches any data necessary to execute any one or more of the micro-operation codes in the currently issued machine word. Typically, this data includes operands fetched from either registers or memory. Note also that like instruction fetches, some data fetches also may stall the pipeline more than one clock cycle. Next, in stage 26, the machine word is executed, that is, each execution unit performs its corresponding function on its assigned micro-operation code. Lastly, stage 28 graduates the instruction, meaning it is allowed to complete and take its effect, if any, on the architected state of the microprocessor. In addition, the result of the instruction, if any, may be written to some store such as a register file. This last operation is commonly referred to as writeback, and sometimes is considered a function which is not part of the final pipeline stage, but which occurs at the same time the instruction is graduated.

Having described the stages of pipeline 10, attention is now directed to its operation in connection with a branch instruction. Initially, fetch stage 12 fetches the branch instruction which is identified as a branch instruction (as opposed to a non-branching instruction). Having identified the instruction as a branch instruction, fetch stage 12 often accesses a branch prediction from a BTB. As known in the art, the BTB predicts whether or not the branch should be taken. Based on this prediction, the predicted next instruction (or predicted "target instruction") is identified and is fetched by stage 12 into pipeline 10 at the same time the branch instruction advances to decode 1 stage 14. With respect to the target instruction, note that such an instruction is typically identified by specifying the address of the instruction rather than the instruction itself. To simplify the current document, however, prediction and next instruction identification will be discussed by referring to an instruction rather than the address of the instruction, with it understood that such identification is commonly achieved by way of the address of the instruction. Thus, returning to the prediction of the target instruction, and assuming no other branch instruction is encountered in the next few clock cycles, note that additional instructions following the target instruction are fetched into pipeline 10 and pass through its stages. Several clock cycles later, however, the branch instruction, in its machine word form, reaches execute stage 26 and is executed. At this point, however, it is determined whether the result of the execution matches that of the prediction from the BTB; in other words, whether the actual target instruction resulting from the executed branch instruction matches the predicted target instruction. If a match occurs, operation can continue with the instructions already fetched into pipeline 10. To the contrary, if a mismatch occurs, pipeline 10, which is now loaded with instructions from the predicted target instruction and those instructions following it, must be flushed from every stage above execute stage 26 and re-loaded with new instructions starting from the actual target instruction. Thus, one skilled in the art will appreciate that numerous clock cycles are wasted due to the flush and refill operations in response to the mismatch.

Figure 1B:
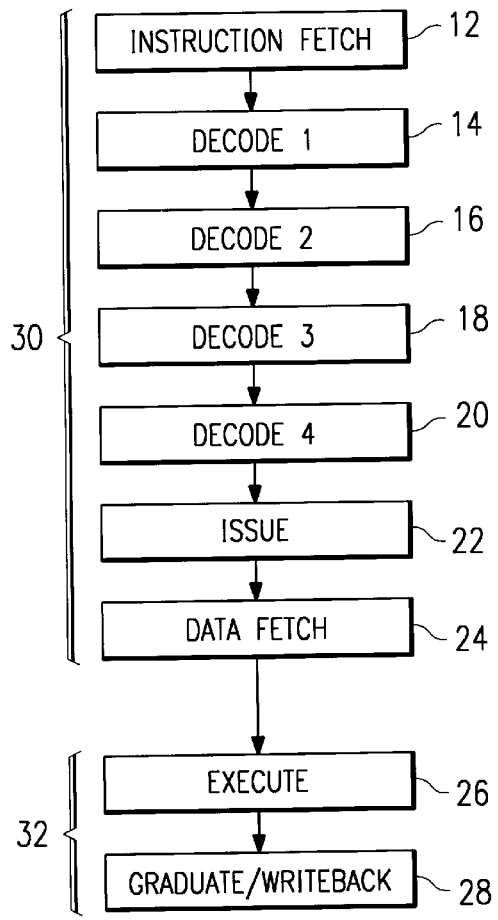
FIG. 1b illustrates the microprocessor pipeline of FIG. 1a, but separated into an instruction preparation group and an instruction execution and completion group.

FIG. 1b illustrates pipeline 10 of FIG. 1a, but separates its stages into two stage groups to demonstrate certain benefits of the embodiments provided below by the present inventors. With reference to FIG. 1b, pipeline 10 includes an upper group of stages 30 and a lower group of stages 32. Given the operations described above, it is recognized by the present inventors that, in general, upper group 30 prepares an instruction, and lower group 32 completes the instruction. The value of considering these separate categories is apparent given the embodiments below. At this point, note that as demonstrated above, if a mispredicted branch occurs, upper group 30 must be flushed and refilled. Generally, therefore, if upper group 30 is an integer U stages long, then the refill operation penalizes performance by consuming at least U clock cycles before the first refill instruction reaches lower group 32 to begin execution of that instruction. Note, therefore, that the value of U is an apparent lower boundary for the number of penalty clock cycles wasted by misprediction. Other delays may further increase the overall penalty. For example, after a misprediction is recognized, some small number of additional clock cycles are often needed to reinitialize the pipeline, that is, to prepare and load the correct target instruction to the fetch unit. In this case, the penalty is increased by this additional number of clock cycles. For purposes of this document, this additional delay for fetch reinitialization is referred to as $F_{reinit}$. Given the above, therefore, the total penalty following misprediction is:

$$\text{clock cycle penalty} = U + F_{reinit} \qquad \text{Equation (1)}$$

Indeed, the clock penalty in Equation 1 may be increased in certain instances, such as when instructions are fetched from a cache (which is often the case), and there is a cache miss on that fetch.

For a BTB with a prediction accuracy, P, the average branch misprediction penalty that accumulates over program execution may be stated as:

$$\text{average branch misprediction penalty} = (1-P)*(U+F_{reinit}) \qquad \text{Equation (2)}$$

Given Equation 2, note further that current BTB technology strives to increase P, that is, the prediction accuracy associated with the BTB. Indeed, considerable resources have been dedicated to improving algorithms and techniques to improve P, thereby reducing the average misprediction penalty. The present inventors, however, have recognized an alternative approach to reducing misprediction penalty, which is readily appreciated from the above presented Equations as well as the following embodiments. Specifically, from Equation 2 (and FIG. 1b) it is clear that an alternative approach to reducing misprediction penalty is by examining potential changes to U because a reduction in U corresponds in the same manner as an increase in P to a reduced misprediction penalty. At first study, U appears to be constant and necessarily fixed by the number of stages in a given pipeline. However, with the following inventive embodiments, it is shown how the effect of U for purposes of Equation 2 may be reduced, thereby accomplishing the purpose of reducing misprediction penalty.

FIG. 2 illustrates an improved pipeline system designated generally at 34. System 34 may be included in various types of mnicroprocessors, an example of which is described below in connection with FIG. 4. At this point, however, the details of such a microprocessor other than shown are eliminated so as to simplify the current discussion. System 34 includes a pipeline 36 which, as in the prior art example of FIG. 1a, includes nine overall stages. To avoid confusion between the FIGS., however, the stages of pipeline 36 are evenly numbered 38 through 54. Additionally, the specific type, function, and number of stages in pipeline 36 are only by way of example, and a person skilled in the art will readily appreciate from the following discussion that alternative pipeline architectures may benefit from the present inventive embodiments without departing from the intended scope of the inventive aspects provided in this document. In all events, the pipeline is generally characterized by having a beginning stage (e.g., stage 38), an ending stage (e.g., stage 54), and a group of intermediary stages (e.g., 40 through 52) between the beginning and ending stage.

The remaining components of system 34 operate to provide novel circuits, systems, and methods for reducing misprediction penalty. Turning then to those components, system 34 further includes a multiplexer 56 and a machine word cache 58. Particularly, the output of issue stage 48 is connected to provide an N bit machine word to a first input of multiplexer 56 as well as a data input of machine word cache 58. The data output of machine word cache 58 is connected to a second input of multiplexer 56 and, therefore, multiplexer 56 may receive an alternative N bit machine word output from machine word cache 58. In addition, machine word cache 58 also provides an ADJUSTED TAR-GET INSTRUCTION control signal to instruction fetch stage 38 as well as a SELECT control signal to control the selection by multiplexer 56 of one of its two inputs to pass on to its output. The output of multiplexer 56 is connected to provide an N bit machine word to data fetch stage 50. Both multiplexer 56 and machine word cache 58 may be constructed according to various known cache techniques. With respect to multiplexer 56, it preferably includes at least the two inputs shown and is operable to output a machine word in response to various control signals detailed below. With respect to machine word cache 58, it preferably includes a storage aspect and a comparison aspect to determine whether the storage aspect includes at a given time a certain group of information so that the information may be output from cache 58 or retrieved from an alternative source. Note also that execute stage 52 provides two control signals to machine word cache 58. The first control signal indicates whether or not the actual target instruction resulting from execution of a branch instruction matches the predicted target instruction for the same branch instruction. Thus, this first control signal is illustrated as a "MISPREDICTED" signal on FIG. 2 which, when asserted, represents that the actual target instruction resulting from execution of a branch instruction does not match the predicted target instruction for the same branch instruction. The second control signal indicates the ACTUAL TARGET INSTRUCTION resulting from execution of a branch instruction. Lastly, note that the same two control signals connected from execute stage 52 to machine word cache 58 are also connected to instruction fetch stage 38.

Each of the FIG. 2 structures and signals is appreciated from an operational description of system 34. The operation of system 34 may be broken down into two categories, the first being for non-branching instructions and the second being for branching instructions. During operation for non-branching instructions, system 34 operates in a manner comparable to the prior art. Specifically, each non-branching instruction passes through each stage of pipeline 36 and is processed and completed accordingly. For additional details, the reader is referred to the above discussion of FIG. 1a as well as various publications in the art for pipelined processing of instructions. The operation for system 34 for branching instructions, however, is a considerable departure from the prior art. As detailed below, machine word cache 58 is loaded in response to a first branch misprediction and then subsequently consulted to potentially output a sequence of machine words in response to a second or later branch misprediction of the same branch instruction which earlier was mispredicted. These aspects of the operation of system 34 are perhaps more easily understood by first considering misprediction in general and second considering the effects of misprediction on loading and later outputting information from machine word cache 58.

Branch misprediction, loading of machine word cache 58, and outputting from machine word cache 58, all occur in various instances as instructions pass through pipeline 36. These instances are understood by way of various examples. Assume first, therefore, that machine word cache 58 is empty, such as at start-up of the microprocessor which implements system 34, and that instructions are being sequentially fetched and processed through pipeline 36. As mentioned above, as long as each instruction is a non-branching instruction, pipeline operation may operate as in the prior art. However, assume now that a branch instruction is fetched into pipeline 36. To simplify the discussion, let us abbreviate this instruction with a capital "I" followed by a number, so that instructions sequentially following it may be represented with increasing numbers; thus, assume the branch instruction is I100. As I100 passes through pipeline 36, it is followed by a group of other instructions representing a portion of a program, sometimes referred to as a "program thread", which is the result of the prediction of whether or not the branch instruction will be taken. For example, if upon fetching I100 it is predicted (e.g., by a BTB) that the branch is not taken, then the predicted target instruction is simply the next successive instruction I101 and the target program thread includes I101, I102, and so forth. Accordingly, as I100 is processed through pipeline 36, each of the preceding stages will affect instructions sequentially following I100 in the program thread. For example, when I100 is in stage 48, each of stages 46 through 38 is processing a successive instruction I101 through I05, respectively. As a result of issue stage 48 processing I100, an N bit machine word is output to multiplexer 56. Since no mispredicted branch action as described below is currently occurring, however, multiplexer 56 merely passes the N bit machine word directly to data fetch stage 50 without any clock cycle delay and, thus, no processing delay is then incurred.

Once I100 reaches stage 52, it is executed at which time it is determined whether or not the branch is, in fact, taken. Recall from the above that the current example predicted that the branch was not taken. Thus, both the instance of a correct prediction and the instance of a misprediction should be explored. For example, assume first that the branch prediction was correct, that is, that execute stage 52 determines that the ACTUAL TARGET INSTRUCTION is I101 and, therefore, that the predicted target instruction which also was I101 matches the ACTUAL TARGET INSTRUCTION. Accordingly, the branch prediction was correct. In this instance, it is indicated to machine word cache 58 via the MISPREDICTED control signal that the prediction was accurate. Since the prediction was accurate, no action is taken with respect to cache 58. Instead, I100 as well as the instructions following it in pipeline 36 continue through each stage to graduation and writeback stage 54. As an alternative example, however, now assume that the branch prediction was incorrect, that is, that the predicted target instruction (i.e., I101) does not match the ACTUAL TARGET INSTRUCTION. For the current example, then, assume that execute stage 52 determines that the ACTUAL TARGET INSTRUCTION is I150 rather than I101. In response, the control signals from execute stage 52 communicate the above-mentioned event to machine word cache 58. In other words, the correct ACTUAL TARGET INSTRUCTION, I150, and the asserted MISPREDICTION signal, are both communicated to machine word cache 58 and to instruction fetch stage 38. The responses to these control signals are detailed below.

Having determined that a branch misprediction occurred for a first time, each of the instructions in pipeline 36 preceding the branch instruction (i.e., I100) is flushed from pipeline 36. Next, instruction fetch stage 38 fetches the actual target instruction (i.e., I150). At this point, therefore, stages 40 through 48 are empty (or invalid), and processing recommences. As I150 reaches issues stage 48, however, and because machine word cache 58 has been notified of an immediately preceding misprediction, machine word cache 58 begins to store a series of machine words as they are successively output by issue stage 48. In the current example, therefore, machine word cache 58 is storing the program thread represented by I150 and the instructions immediately following it. In the preferred embodiment, and for reasons more evident below, the size of the program thread stored ill this manner includes a number of machine words equal to the number of pipeline stages above execute stage 52 minus the number of clock cycles taken to retrieve the first stored machine word from machine word cache 58 to execute stage 52 (i.e., which includes possible latencies of cache 58 and communication through multiplexer 56 as well as data fetch stage 50). In the example of FIG. 2, assume two clock cycles are needed to provide a machine word from machine word cache 58 to execute stage 52 and, therefore, the size of the program thread is five (i.e., seven stages above execute stage 52 minus two clock cycles). Thus, during the current clock cycle as well as each of the next four clock cycles, machine word cache 58 stores a successive machine word from issue stage 48 as it outputs those machine words. At the end of those five clock cycles, therefore, machine word cache 58 stores a program thread of five machine words, and those machine words correspond to the issued machine words from I150 through I154. In the meantime, as these five machine words are output from issue stage 48, they also are communicated onward through multiplexer 56 to the stages 50 through 54 following multiplexer 56. Thus, as each machine word is being stored into machine word cache 58 as described above, it also passes toward execution, graduation, and writeback as well.

Given the above, next consider the instance where a branch instruction which was earlier mispredicted a first time is again n-spredicted a second time. Thus, continuing with the example from above, assume that I100 is again fetched into pipeline 36. Indeed, as demonstrated by a program code example in FIG. 3 below, note that this is quite possible for nested looping in program instructions. In any event, assume once again that the BTB (or whatever other prediction technique) predicts I101 as the target for instruction I100, when in fact I100 should branch to I150. Again, therefore, I100 as well as I101 through I107 are eventually fetched into pipeline 36 until I100 reaches execute stage 52. At this point, execute stage 52 again determines an actual target of I150 and communicates this ACTUAL TARGET INSTRUCTION (or an address of that instruction) along with the asserted MISPREDICTION signal to instruction fetch stage 38 and machine word cache 58. In response, again pipeline 36 is flushed of each instruction in the stages located above execute stage 52. In stark contrast to the prior art, however, instruction fetch stage 38 may not necessarily recommence with the ACTUAL TARGET INSTRUCTION of I150, but may operate in conjunction with machine word cache 58 as detailed below.

Once machine word cache 58 receives an asserted MISPREDICTION signal and an ACTUAL TARGET INSTRUCTION, the comparison circuitry of machine word cache 58 searches the contents of the storage capacity of the cache to determine whether it stores a program thread corresponding to the ACTUAL TARGET INSTRUCTION (e.g., I150). In the present example, recall from above that cache 58 has previously stored a five machine word program thread corresponding to I150. Thus, assuming that program thread is still stored within cache 58, a cache "hit" occurs. In response to the cache hit, machine word cache 58 outputs various controls. As one control, machine word cache 58 changes the state of the SELECT signal to multiplexer 56. As another control, machine word cache 58 passes the ADJUSTED TARGET INSTRUCTION to instruction fetch stage 38. Each of these controls operates as follows. With respect to the changed SELECT signal, recall from the above that multiplexer 56 earlier was passing each N bit machine word from its first input, that is, the input connected to issue stage 48, to data fetch stage 50. However, in response to the changed state of the SELECT signal, multiplexer 56 begins outputting the data received at its second input, that is, the input connected to the output of machine word cache 58 to data fetch stage 50. Thus, for each successive clock cycle until SELECT is changed again, a successive machine word connected to data fetch stage 50 arrives from machine word cache 58 rather than from issue stage 48. With respect to the ADJUSTED TARGET INSTRUCTION, at the same time that the five machine words from cache 58 are successively passing into stage 50 and beyond, fetch unit 38 is fetching instructions commencing at the ADJUSTED TARGET INSTRUCTION. Note that the value of the ADJUSTED TARGET INSTRUCTION is established so that the first instruction fetched is immediately following the instruction which is represented by the last machine word in the program thread to be output by cache 58. For example, in the current instance, recall that the first machine word in the program thread from cache 58 corresponds to instruction I150. If the next four machine words in the thread correspond to instructions I151 through I154, then the value of the ADJUSTED TARGET INSTRUCTION is set at I155.

Once the controls are established from SELECT and the ADJUSTED TARGET INSTRUCTION, and given some possible latency in accessing cache 58, at the same time the lower stages 50 through 54 process the program thread from cache 58 the upper stages 38 through 48 are loaded beginning at I155. Note that the latency in accessing cache 58 may be on the order of one clock cycle, and may be further reduced based on implementation details. Further, the simultaneous processing by the upper and lower stages is also understood with reference to the present example, but latency may be changed which would modify the present examples. In all events, recall that the program thread stored by machine word cache 58 is preferably five machine words long. Consequently, SELECT is maintained at its current state for five clock cycles and, therefore, each of the five machine words of the program thread from cache 58 is successively passed to the lower stages 50 through 54 of pipeline 36. In the meantime (possibly beginning one or two clock cycles earlier), instruction fetch stage 38 begins fetching from the ADJUSTED TARGET INSTRUCTION of I155 forward. Looking then at a first clock cycle, and assuming some latency to machine word cache 58, during this first clock cycle the machine word for I150 is accessed from machine word cache 58 while instruction I155 is fetched into stage 38. During a second clock cycle, I156 is loaded into instruction fetch stage 38 and already-fetched I155 passes to decode 1 stage 40, while the first machine word from cache 58 (i.e., I150) now passes through multiplexer 56 to data fetch stage 50 and at the same time a second machine word is being accessed from machine word cache 58 (i.e., I151). Note further the effect as this process continues with respect to the upper and lower stages, respectively. During the third clock cycle, I157 is loaded into instruction fetch stage 38, already-fetched I156 passes to decode 1 stage 40, and already-fetched I155 passes to decode 2 stage 42, while I150 reaches execute stage 52, I151 reaches data fetch stage 50, and I152 is being accessed from machine word cache 58. This flow continues for the next three clock cycles, at which time I155 is in issue stage 48 while the last machine word, which corresponds to I154, is in data fetch stage 50.

Having completely output its program thread of machine words, machine word cache 58 now switches the state of the SELECT signal connected to control multiplexer 56. Thus, for the next clock cycle, multiplexer 56 switches its output back to its first input. As a result, the next machine word forwarded to data fetch stage 50 is selected from issue stage 48. In the current example, recall at this point that the machine word from issue stage 48 corresponds to I155. Thus, during this clock cycle, I155 passes to data fetch stage 50. At this point, operation returns to that of a non-branching scenario where instructions pass through pipeline 36 in the manner described above.

Recall from the above that once machine word cache 58 receives an asserted MISPREDICTION signal and an ACTUAL TARGET INSTRUCTION, its comparison circuitry may determine a cache hit as is demonstrated by way of the above example. On the other hand, a cache miss may occur. If such a miss occurs, then the same flush and refill of pipeline 36 described above in the example of a first-time branch misprediction occurs. Indeed, the operation in response to the branch misprediction occurring for a first time is actually an instance of a cache miss. Specifically, as the branch instruction (e.g., I100) is executed for the first time at stage 52, the MISPREDICTION signal causes cache 58 to determine whether it stores a program thread corresponding to the correct ACTUAL TARGET INSTRUCTION. Since cache 58 is at that point empty, however, it results in a cache miss. Given the cache miss, the same operations described above in connection with the first time misprediction occur. Thus, pipeline 36 is flushed of all stages before execute stage 52 and instruction fetch stage 38 re-commences its fetch at the ACTUAL TARGET INSTRUCTION. As another example, a cache miss may occur some time after start-up, when a program thread which was earlier stored in cache 58 has been evicted. In all events, therefore, upon a cache miss, a pipeline flush and refill are contemplated and then pipeline flow continues as described above.

Additional discussion is also noteworthy regarding the size of the program threads stored in machine word cache 58. Note that the preceding example using a program thread with instructions I150 through I154 demonstrates that the preferred number of machine words in a program thread within machine word cache 58 is equal to the number of pipeline stages above execute stage 52 minus the number of clock cycles taken to retrieve the first stored machine word from machine word cache 58 to execute stage 52. One skilled in the art will appreciate, however, that this preferred number may be adjusted either upward or downward given various considerations. As an example of an upward adjustment, if a pipeline requires some initial cycles such as those represented by $F_{reinit}$ described earlier, then the number of machine words per cached program thread may increase to accommodate the additional cycles required before the refilled upper pipeline is again capable of supplying machine words to multiplexer 56. As an example of a downward adjustment, if the access time of machine word cache 58 were reduced, then the number of machine words in a cached program thread may is reduced accordingly. For example, above a latency of one clock cycle is shown. If this latency were reduced to zero, then machine word cache 58 would preferably store four machine words per program thread rather than five. As another example, the above techniques assume that branch misprediction is detected in execute stage 52; however, in newer approaches there may be certain instances where branch misprediction occurs at a stage earlier (i.e., above) than the execute stage in a pipeline. In such a case, the number of machine words per cached program thread may reduce because fewer machine words are required to re-fill the pipeline above that earlier stage. As still a final example, if as sometimes is the case the lower pipeline stalls temporarily after a detected misprediction while the upper pipeline fetches and continues to process instructions beginning with the new target instruction, then the size of the program thread could be reduced one machine word for each cycle in which the lower pipeline was stalled while the upper pipeline processed. Still other examples will be ascertainable by a person skilled in the art.

Given the above, one skilled in the art will recognize that system 34 provides a vastly reduced misprediction penalty over the prior art. First, the factor of $F_{reinit}$ from Equation 2 is eliminated because the wait period giving rise to that element is not necessary in system 34. Second, all or most of the delay through the U stages, as reflected in Equation 2 and which is required to re-fill a pipeline in the prior art, is also eliminated. This is highly significant since modern microprocessors generally spend more time preparing instructions for execution, and the present embodiments substantially reduce the time otherwise wasted preparing instructions which eventually are flushed from the pipeline due to a misprediction. Moreover, as microprocessors continue to develop, pipeline depth appears also to be increasing so that U increases as well. Thus, at a time where flush and refill penalty looks to increase, the only delay of interest in such a microprocessor implementing the present embodiments may be one or two clock cycles expended in the access path from machine word cache 58 through multiplexer 56 to data fetch stage 50. Depending on various design considerations, this delay might be reduced or even eliminated. Moreover, even in the instance of an expended two clock cycles, the overall delay is far less than the U clock cycles required in the prior art. In addition, note that system 34 may be used alone or in combination with other techniques such as branch removal and predication of the branch. Still further, note that the above embodiments are readily straightforward to implement and, indeed, portions of its architecture may already be partially supported in hardware. For example, multiplexer 56 already may exist to allow introduction of microcode from a microROM to the pipeline as known in certain architectures; in such an instance, it is necessary to provide an additional input to such a multiplexer with that input connected to a cache such as cache 58, and to provide the additional control to the multiplexer as described above. As another example, the MISPREDICTED and TARGET ADDRESS signals also may exist to support various types of instruction fetch unit and BTB structures. Still further, as mentioned above, machine word cache 58 may be constructed using various techniques. For example, so-called decoded instruction caches have been proposed for other purposes, and may be modified by a person skilled in the art to achieve the connections and functionality described in this document. For example, the reader is referred to such caching techniques as shown in the following documents, each of which is incorporated herein by reference: (1) "HPSM, A High Performance Restricted Data Flow Architecture Having Minimal Functionality," by W-M. Hwu and Y. N. Patt, Proc. ISCA, Tokyo, 1986, pp. 297–306; (2) "Hardware Support for Large Atomic Units in Dynamically Scheduled Machines," by S. W. Melvin, M. C. Shebanow, and Y. N. Patt, Proc. Micro-21, San Diego, Dec. 1988, pp. 60–66; (3) "A Fill-Unit Approach to Multiple Instruction Issue,", by M. Franklin and M. Smotherman, Proc. Micro-27, San Jose, Nov. 1994, pp. 162–171; and (4) "Improving CISC Instruction Decoding Performance Using a Fill Unit," by M. Franklin and M. Smotherman, Proc. Micro-28, Dec. 1995, pp. 219–229.

Figure 3:
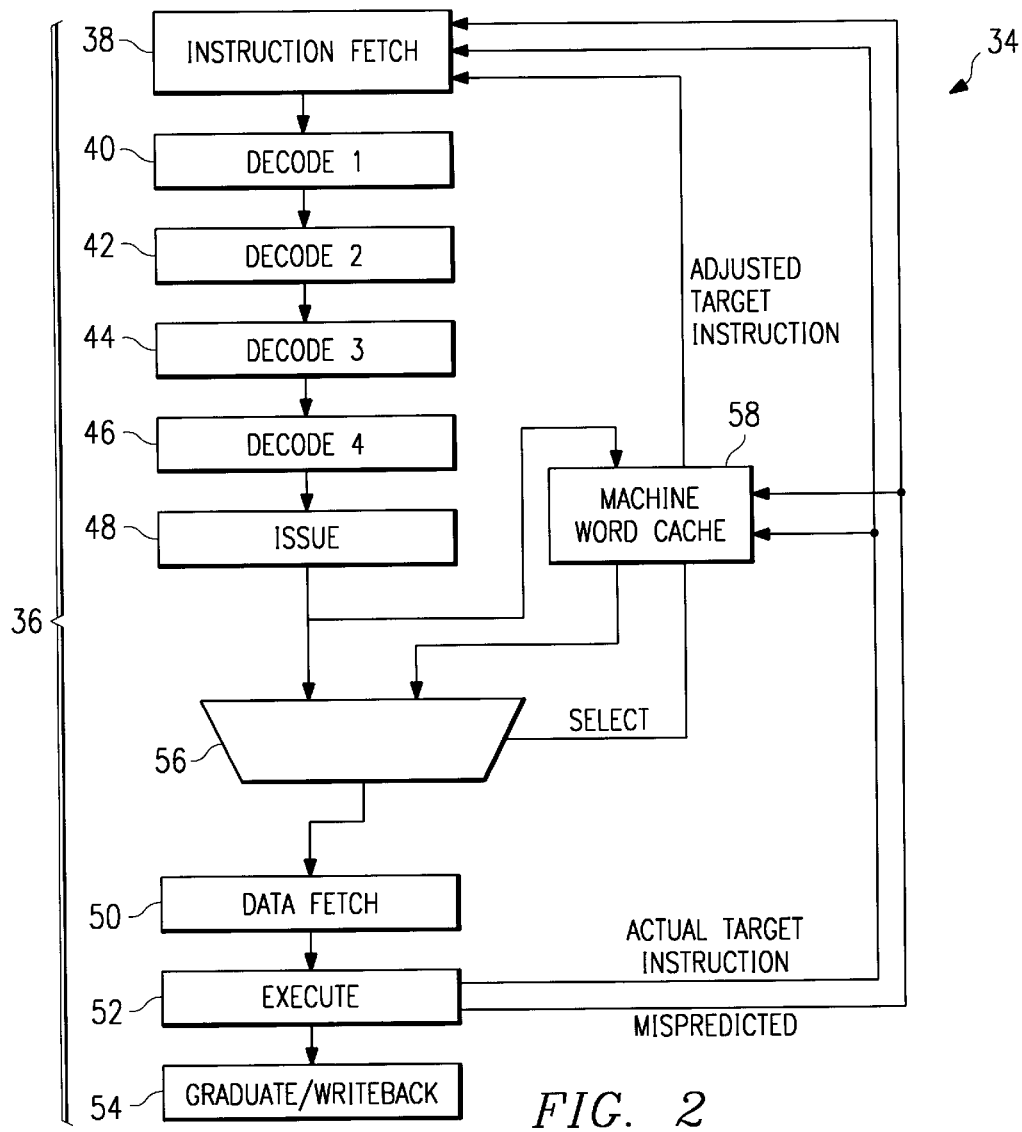
FIG. 3 illustrates a sample of program code having an outer loop occurring K times and which, while possibly repeating a branch misprediction and complete pipeline flush for all K endings of its inner loop, benefits by not requiring a complete pipeline refill before being able to commence execution of the actual target instruction.

FIG. 3 illustrates an example shown in C code of nested loops which are common in programming code and which may benefit greatly given the above embodiments. One skilled in the art will appreciate from FIG. 3 that each time the outer loop is processed, the inner loop processes 100 times. Consider now the processing of the code in FIG. 3. During the first processing of the outer loop, the inner loop is processed 100 times. At the end of each inner loop, the code will branch back to the beginning of the inner loop 100 consecutive times. Consequently, given typical prediction schemes, the prediction after a certain number of reiterations will be equivalent to "strongly taken." However, on the $101^{st}$ entry to the inner loop, the prediction of strongly taken is inaccurate (i.e., the actual target instruction is the one following the end of the inner loop). Given the above embodiments, this first misprediction causes a flush and refill of pipeline 36, along with a store into cache 58 of a group of machine words representing the program thread beginning at the next actual instruction, that is, the instruction immediately after the inner loop. The outer loop, however, will eventually repeat to process a second time. Again, the inner loop will process 100 times and cause a misprediction upon its $101^{st}$ entry. At this point, however, a hit will occur in cache 58 and many of the cycles lost in the first flush and refill of pipeline 36 will not occur a second time. Indeed, note that this savings may well occur each additional time the outer loop processes, thereby vastly improving efficiency over a prior art scenario which caused a flush and refill with each instance of the outer loop.

Having explained the above embodiments, additional considerations are also discussed below given various of its aspects, and include a discussion of cache sizing, cache loading, cache eviction, and microprocessor architecture.

From the above it is clear that machine word cache 58 is in many respects a typical cache structure. However, given its particular storage and functionality requirements, some consideration may be made to the desirable size for the cache, given that it stores program threads in the form of machine words output by issue stage 48. As earlier stated, a program thread is preferably the number of pipeline stages above execute stage 52 minus the number of clock cycles taken to retrieve the first stored machine word from machine word cache 58 to execute stage 52. Moreover, it is stated above that a machine word is commonly on the order of 50 bits times the number of execution units in the microprocessor. Lastly, however, there is consideration as to how many program threads are to be stored in machine word cache 58. From a cache hit standpoint, ideally machine word cache 58 could store an infinite number of program threads and be pre-loaded with those threads to minimize cache misses. However, a more realistic approach balances performance gain versus the costs of an additional cache structure. In all events, the present inventors have empirically determined that machine word cache 58 may be sized to store as few as four program threads and still achieve considerable improvement to branch misprediction penalty with only the limited requirements necessary for this relatively small structure; moreover, machine word cache 58 may be sized larger to store on the order of more than four program threads (e.g., such as from 8 to 256, or even a larger number of, program threads) with even greater improvement to branch misprediction penalty. In addition to the program threads, additional fields will be stored within the cache, such as the ADJUSTED TARGET INSTRUCTION discussed above as well as possible additional fields to assist with redirecting or restarting instruction fetching. Still further, and as discussed below, an additional field(s) may be included to control entry into and eviction from cache 58.

As cache 58 operates to permit caching techniques, still other considerations arise as to when it is appropriate to load and empty entries into the cache. In the preferred embodiment, the loading of cache 58 occurs each time a mispredicted branch occurs for the first time in the manner described above. However, in an alternative embodiment, additional hardware may be included to determine other features of the particular mispredicted branch and, if for some reason the branch is less probable to occur or be mispredicted in the future, it may be possible to inhibit the cache from storing the immediately following program thread even though a misprediction has occurred. Thus, this approach would approximate a less-likely-to-be-used technique. Note further that these types of considerations also may apply to evicting a program thread from cache 58, that is, when to clear or overwrite a given program thread already stored in cache 58. In the preferred embodiment, such as where there are up to four program threads stored in cache 58, the program thread which was least recently used is evicted from the cache when it is desirable to load yet another (e.g., the fifth) program thread into the cache. Note, however, that alternative techniques may be ascertained by a person skilled in the art. For example, cache 58 could evict program threads on a first-in first-out basis or on a random basis. As another alternative, as mentioned as a loading technique above, some probabilistic measure could be included for evicting the thread which is least probable to be used again. Lastly, as mentioned above, note that additional fields are likely to be included in the cache (or elsewhere) to accommodate either loading or eviction techniques.

Figure 4:
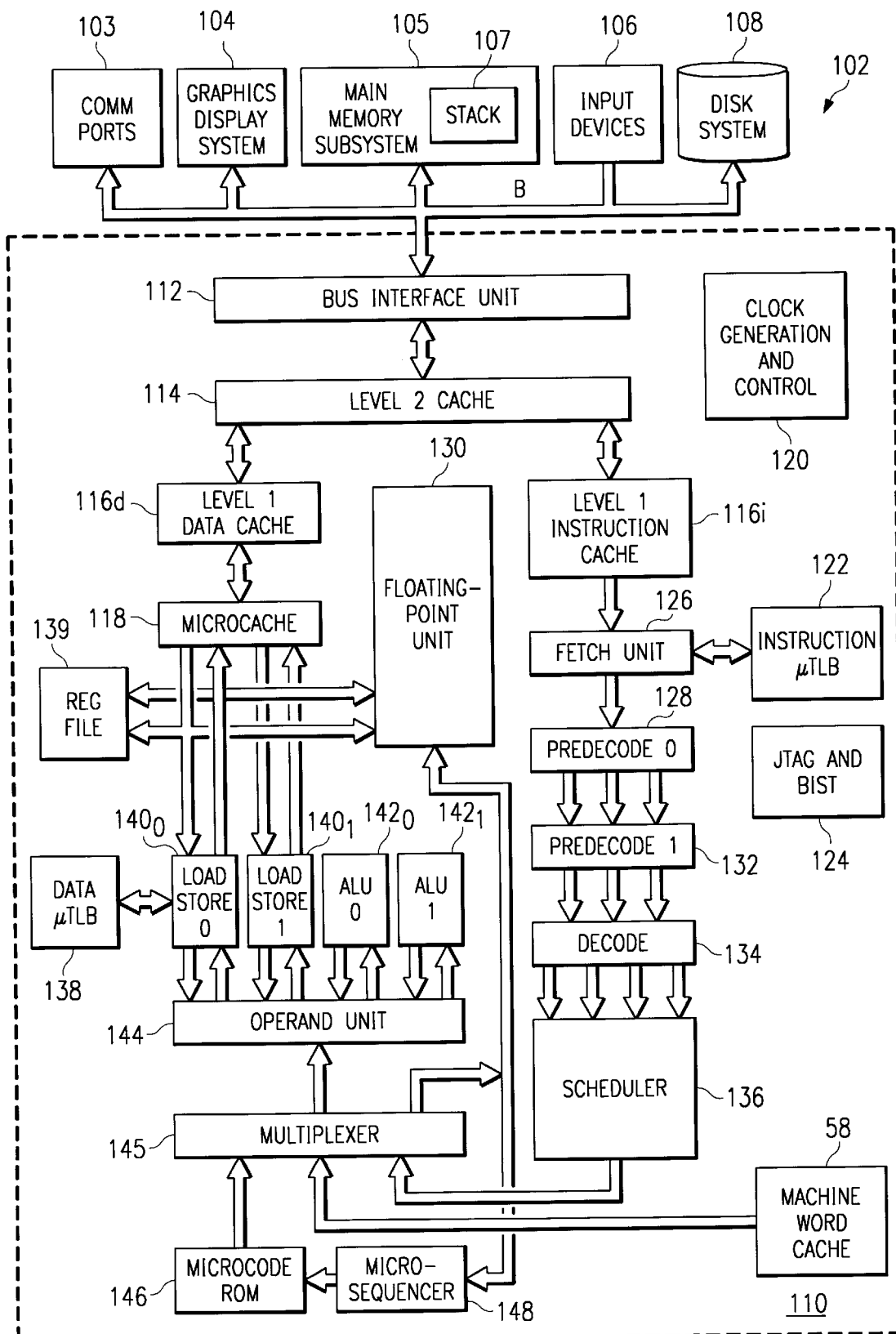
FIG. 4 illustrates an exemplary data processing system within which the preferred embodiments may be implemented.

Having described the above embodiments, FIG. 4 illustrates a block diagram of a microprocessor embodiment into which the above embodiments may be incorporated. Referring now to FIG. 4, an exemplary data processing system 102, including an exemplary superscalar pipelined microprocessor 110 within which the preferred embodiment is implemented, will be described. It is to be understood that the architecture of system 102 and of microprocessor 110 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures.

Microprocessor 110, as shown in FIG. 4, is connected to other system devices y way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM) and includes a stack 107, input devices 106 (including keyboard, a pointing device, and the interface circuitry therefor), and disk system 108 (which may include hard disk drives, floppy disk drives, and CD-ROM drives). It is therefore contemplated that system 102 of FIG. 4 corresponds to a conventional desktop computer or workstation, as are now common in the art. Of course, other system implementations of microprocessor 110 can also benefit from the present embodiments, as will be recognized by those of ordinary skill in the art.

Microprocessor 110 includes a bus interface unit ("BIU") 112 that is connected to bus B, and which controls and effects communication between microprocessor 110 and the other elements in system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus clock from bus B; the frequency of the internal clock phases, in this example, may be selectably programmed as a multiple of the frequency of the bus clock.

As is evident in FIG. 4, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114, Of course, microprocessor 110 may also effect bus traffic around level 2 cache 114, by treating certain bus reads and writes as "not cacheable". Level 2 cache 114, as shown in FIG. 4, is connected to two level 1 caches 116; level 1 data cache $116_d$ is dedicated to data, while level 1 instruction cache $116_i$ is dedicated to instructions. Power consumption by microprocessor 110 is minimized by accessing level 2 cache 114 only in the event of cache misses of the appropriate one of the level 1 caches 116. Furthermore, on the data side, microcache 118 is provided as a level 0 cache, which in this example is a fully dual-ported cache.

As shown in FIG. 4 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $142_0$, $142_2$ for processing conditional branch, integer, and logical operations, floating-point unit (FPU) 130, two load-store units $140_0$, $140_1$, and microsequencer 148. The two load-store units 140 utilize the two ports to microcache 118, for true parallel access thereto, and also perform load and store operations to registers in register file 139. Data microtranslation lookaside buffer ($\mu$TLB) 138 is provided to translate logical data addresses into physical addresses, in the conventional manner.

These multiple execution units are controlled by way of multiple pipelines with seven stages each, with write back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register and/or memory operands indicated by the AOps |
| EX | Execute: This stage runs the execution units according to the AOps and the retrieved operands |
| WB | Write back: This stage stores the results of the execution in registers or in memory |

Referring back to FIG. 4, the pipeline stages noted above are performed by various functional blocks within microprocessor 110. Fetch unit 126 generates instruction addresses from the instruction pointer, by way of instruction micro-translation lookaside buffer (μFLB) 122, which translates the logical instruction address to a physical address in the conventional way, for application to level 1 instruction cache 116$_i$. Instruction cache 116$_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable length), and as such consists of three instruction recognizers; predecode 1 unit 132 recodes the multi-byte instructions into a fixed-length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases. Scheduler 136 reads up to four AOps from the decode queue at the output of decode unit 134, and assigns these AOps to the appropriate execution units. In addition, the operand unit 144 receives and prepares the operands for execution, As indicated in FIG. 4, operand unit 144 receives an input from scheduler 136 and also from microcode ROM 148, via multiplexer 145, and fetches register operands for use in the execution of the instructions. In addition, according to this example, operand unit 144 performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely-used x86 instructions, x86 instructions that modify segment or control registers, handling of exceptions and interrupts, and multi-cycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Given the description of FIG. 4, as well as the descriptions above such as those relating to the prior FIGS, one skilled in the art may appreciate that system 34 of FIG. 2 may be incorporated in connection with various components shown in FIG. 4. For example, the various stages like fetch unit 126, predecode 0 128, predecode 1 132, decode 134, and scheduler 136 may be used in place of stages 38 through 48 of system 34. As another example, multiplexer 145 is connected to microcode ROM 146 and is further connected to a machine word cache 58 as in the manner that multiplexer 56 is connected to cache 58 in system 34 (although the remaining control signals in connection with cache 58 are not shown in FIG. 4 so as to simplify the drawing). As still another example, the various execution units (e.g., ALU0 142$_0$, ALU1 142$_1$, load store 0 140$_0$ load store 1 140$_1$, and floating point unit 130) of FIG. 4 may represent execute stage 52. Still further, various related functionality may be further performed by the appropriate circuitry within FIG. 4.

From the above, one skilled in art may appreciate various benefits of the present embodiments. For example, a microprocessor in accordance with the various embodiments may efficiently handle branch mispredictions with a reduced amount of clock cycle delay. As another example, the cache sizing and techniques provided above may be further modified given various considerations in the cache art. As another example, the pipeline stages set forth above are by way of example and more, less, or alternative stages could be used, and the multiplexing functionality to the cached machine words may be interposed before a stage other than the issue stage. As still another example, various control signals may be modified or attributed to other circuits while still accomplishing the functionality set forth. As yet another example, while the microprocessor of FIG. 4 depicts an exemplary microprocessor to benefit from the inventive embodiments, other microprocessor architectures could benefit as well. Indeed, these benefits and examples serve further to demonstrate that while the present embodiments have been described in detail, various substitutions, modifications or alterations could be made to the descriptions set forth above without departing from the inventive scope. Thus, in addition to the many options set forth above still other alternatives will be ascertainable by a person skilled in the art, and all of the above demonstrates the flexibility of the inventive scope which is defined by the following claims.

What is claimed is:

1. A microprocessor, comprising:

an instruction pipeline comprising a plurality of successive instruction stages, wherein an instruction passes from a beginning stage of said plurality of successive instruction stages, through a plurality of intermediary stages of said plurality of successive instruction stages, and to an ending stage of said plurality of successive instruction stages, said plurality of successive instructions stages including a set of at least one instruction preparation stages outputting a machine word controlling a set of micro-operations followed by a set of at least one instruction execution and completion stages responsive to said machine word to perform said set of micro-operations;

a branch prediction circuit operable to predict a branch target instruction of a conditional branch instruction in said instruction pipeline enabling fetching of instructions beyond said conditional branch instruction starting at said predicted branch target;

one stage of said at least one instruction execution and completion stages indicating whether an actual branch target instruction resulting from execution of a conditional branch instruction matches said predicted branch target instruction for the same conditional branch instruction;

a storage circuit coupled to receive and store at least one program thread information, each program thread information including a predetermined number of machine words output from said set of at least one instruction preparation stages;

selection circuitry comprising a first input, a second input, and an output for outputting output information selected from said first and second inputs, wherein said first input is coupled to receive a machine word output from said set of at least one instruction preparation stages, wherein said second input is coupled to receive a machine word output from said storage circuit, and wherein said output is coupled to a machine word input of plurality of intermediary stages, wherein said second stage follows said set of at least one instruction execution and completion stages;

said storage circuit determining whether one of said program thread information stored therein includes instructions beginning at said actual branch target instruction upon indication that said actual branch target instruction does not match said predicted branch target instruction, wherein if one of said program thread information includes instructions beginning at said actual branch target instruction, then supplying said predetermined number of machine words of said program thread information recalled from said storage circuit to said selection circuitry and controlling said selection circuitry to select said second input for said predetermined number of machine words, and if one of said program thread information does not includes instructions beginning at said actual branch target instruction, then storing a new program thread including said predetermined number of machine words output from said set of instruction preparation stages.

2. The microprocessor of claim 1:

wherein said beginning stage comprises an instruction fetch stage; and wherein said storage circuit determines an adjusted branch target instruction address having a predetermined offset from said actual branch target instruction if said actual branch target instruction does not match said predicted branch target instruction and one of said program thread information includes instructions beginning at said actual branch target instruction, said storage circuit supplying said adjusted branch target instruction address to said instruction fetch stage for fetching instructions into said instruction pipeline beginning with said adjusted branch target instruction address, said predetermined offset selected relative to a number of stages in said set of instruction preparation stages and other latencies whereby said set of instruction preparation stages outputs a machine word corresponding to said adjusted branch target instruction in an operation cycle immediately following recall of a last machine word in said program thread information from said storage circuit.

3. The microprocessor of claim 1:

one stage of said at least one instruction execution and completion stages further outputting an address signal indicating said actual branch target instruction corresponding to said conditional branch instruction;

wherein said storage circuit stores an indication of branch target instruction with each program thread information; and wherein said storage circuit further includes comparison circuitry for determining whether one of said program thread information stored therein includes instructions beginning at said actual branch target instruction by comparing said actual branch target instruction with said stored indication of branch target instruction for each program thread information.

4. The microprocessor of claim 1:

wherein said plurality of instruction stages comprises a first integer number of stages including an execute stage;

wherein a second integer number of clock cycles are required to communicate a first machine word from said program thread information in said storage circuit to said execute stage; and wherein said predetermined number of machine words of said program thread information comprises a number of machine words equal to said first integer number minus said second integer number.

5. The microprocessor of claim 1:

wherein said plurality of instruction stages comprises a first integer number of stages including an execute stage;

wherein a second integer number of clock cycles are required to communicate a first machine word from said program thread information in said storage circuit to said execute stage; and wherein said predetermined number of machine words of said program thread information comprises a number of machine words less than said first integer number minus said second integer number.

6. The microprocessor of claim 1 wherein said program thread information comprises a first program thread of a plurality of program threads, and wherein said storage circuit is further operable to store said plurality of program threads.

7. The microprocessor of claim 6 wherein said plurality of program threads is four program threads.

8. The microprocessor of claim 6 and further comprising circuitry for evicting one of said plurality of program threads, wherein said circuitry for evicting evicts a least recently used of said plurality of program threads from said storage circuit if said actual branch target instruction does not match said predicted branch target instruction and one of said program thread information does not include instructions beginning at said actual branch target instruction.

9. A method of operating a microprocessor, comprising the steps of:

receiving an instruction into a pipeline comprising a plurality of successive instruction stages, wherein the received instruction passes from a beginning stage of said plurality of successive instruction stages, through a plurality of intermediary stages of said plurality of successive instruction stages, and to an ending stage of said plurality of successive instruction stages;

detecting whether the received instruction is a conditional branch instruction;

responsive to detecting that the received instruction is a conditional branch instruction, predicting a predicted target instruction corresponding to the branch instruction;

fetching a program thread into the instruction pipeline, wherein the program thread commences with the predicted target instruction and comprises a plurality of additional instructions following the predicted target instruction;

determining whether an actual target instruction corresponding to the conditional branch instruction matches the predicted target instruction; and responsive to determining that the actual target instruction does not match the predicted target instruction, successively fetching instructions from a program thread stored in a storage circuit to one of the intermediary stages, wherein the program thread stored in the storage circuit commences with the actual target instruction and comprises a plurality of additional instructions following the actual target instruction.

10. The method of claim 9 wherein said step of successively fetching instructions from a program thread stored in a storage circuit to one of the intermediary stages comprises successively fetching instructions from a program thread stored in a storage circuit to an issue stage.

11. The method of claim 9 and, prior to said step of successively fetching instructions from a program thread stored in a storage circuit, the step of determining whether the storage circuit stores the program thread commencing with the actual target instruction and comprising a plurality of additional instructions following the actual target instruction.

12. The method of claim 9 and, prior to said step of successively fetching instructions from a program thread stored in a storage circuit, the step of storing into the storing circuit the program thread commencing with the actual target instruction and comprising a plurality of additional instructions following the actual target instruction.

13. The method of claim 12 wherein said step of storing into the storing circuit the program thread comprises storing into the storing circuit the program thread in response to determining that the actual target instruction does not match the predicted target instruction.

14. The method of claim 9 and, responsive to determining that the actual target instruction does not match the predicted target instruction, flushing from the pipeline each instruction of the program thread commencing with the predicted target instruction and comprising a plurality of additional instructions following the predicted target instruction other than the predicted target instruction.

15. The method of claim 9 and, during said step of successively fetching instructions from a program thread stored in a storage circuit to one of the intermediary stages, fetching into the pipeline from a source other than the storage circuit an instruction immediately following a last instruction in the program thread stored in the storage circuit.

16. The method of claim 9, further including the step of fetching into said pipeline instructions beginning with an adjusted branch target instruction having a predetermined offset from said actual branch target instruction if said actual branch target instruction does not match said predicted branch target instruction and one of said program thread information includes instructions beginning at said actual branch target instruction, said predetermined offset selected relative to a number of stages in said set of instruction preparation stages and other latencies whereby said fetched instructions reaches said one of said intermediary stages immediately following recall of a last machine word in the program thread information from the storage circuit.

* * * * *